United States Patent

Stolle et al.

[11] Patent Number: 4,982,547
[45] Date of Patent: Jan. 8, 1991

[54] CORNER CONNECTOR FOR HOLLOW EXTRUSIONS

[75] Inventors: Klaus Stolle, Coquitlam; Gerd Schoeffel, Maple Ridge, both of Canada

[73] Assignee: Stollco Industries Ltd., Port Coquitlam, Canada

[21] Appl. No.: 331,654

[22] Filed: Mar. 29, 1989

[51] Int. Cl.$^5$ .............................................. E04C 2/38
[52] U.S. Cl. .................................... 52/656; 403/295; 403/402
[58] Field of Search .................. 52/656; 403/295, 401, 403/403, 402

[56] References Cited

U.S. PATENT DOCUMENTS

| | | | |
|---|---|---|---|
| 2,666,508 | 1/1954 | Nardulli | 403/295 X |
| 2,703,159 | 3/1955 | Fleet | 403/295 |
| 2,776,735 | 1/1957 | Bancroft | 403/295 |
| 3,216,539 | 11/1965 | Piget | 403/295 |
| 3,294,429 | 12/1966 | Halip | 403/295 |
| 3,304,108 | 2/1967 | Hamilton et al. | 403/295 |
| 3,767,237 | 10/1973 | Suchowski | 403/402 |
| 3,854,268 | 12/1974 | Gutner | 403/403 |
| 3,932,046 | 1/1976 | Kawazu | 403/402 |
| 4,452,138 | 6/1984 | Bubley et al. | 403/402 X |
| 4,516,341 | 5/1985 | Jenkins | 403/402 X |
| 4,596,488 | 6/1986 | Schendan | 403/295 X |
| 4,725,083 | 2/1988 | Schauer | 403/295 X |

Primary Examiner—Henry E. Raduazo
Attorney, Agent, or Firm—Christie, Parker & Hale

[57] ABSTRACT

A corner connector for a pair of extrusions having hollow interiors of rectangular cross-section is formed as an L-shaped piece of sheet metal having a pair of arms extending at an angle to one another for connecting the extrusions together at the same angle. Each of the arms has opposite longitudinal edges which are located on a common edge plane, and the common edge planes of the two arms are inclined relative to one another, so that the arms can be engaged with diagonally opposite corners of the rectangular hollow interiors of the extrusions, thus avoiding wastage of the sheet metal.

9 Claims, 2 Drawing Sheets

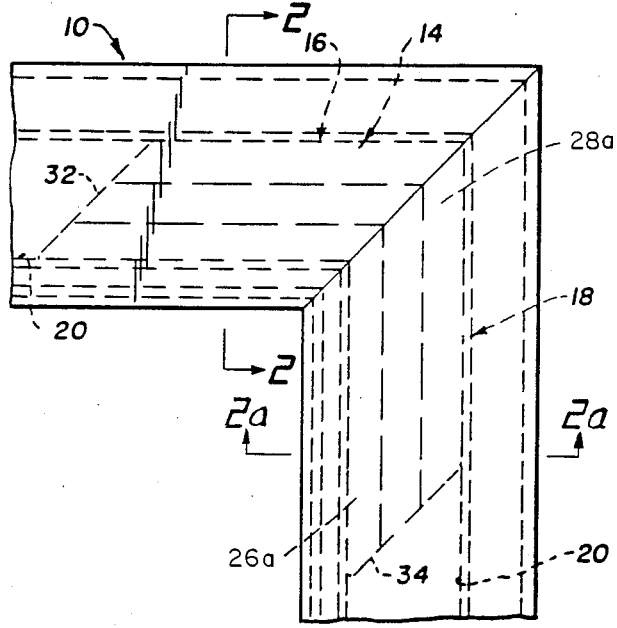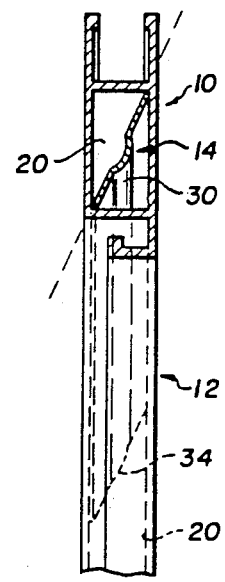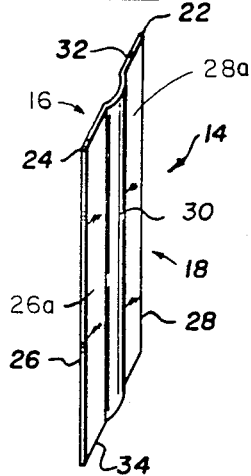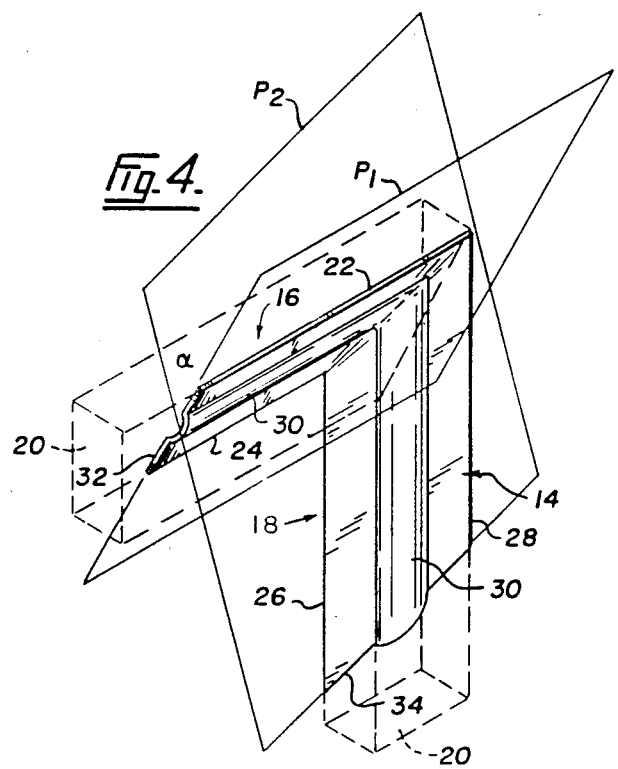

4,982,547

CORNER CONNECTOR FOR HOLLOW EXTRUSIONS

FIELD OF THE INVENTION

The present invention relates to a corner connector for a pair of extrusions having hollow interiors of rectangular cross-section, such as are employed, for example, in aluminum doors, storm windows, etc.

BACKGROUND OF THE INVENTION

Corner connectors previously employed for this purpose comprise a pair of arms extending at right angles to one another, the connectors being made of sheet metal and the arms each having a U-shaped cross-sections, and the arms being coupling at each side of the connector so as to fit snugly into the rectangular hollow interiors of the extrusions in surface-to-surface with three sides of the interior of each extrusion.

SUMMARY OF THE INVENTION

It is an object of the present invention to provide a novel and improved connector for hollow extrusions which are made of sheet metal and which enable a substantial reduction in the amount of sheet metal required for each connector, as compared to the above-described prior art corner connectors.

According to the present invention, a corner connector for a pair of extrusions having hollow interiors of rectangular cross sections comprises an L-shaped piece of sheet metal having a pair of arms extending at an angle to one another for connecting the extrusions together at the same angle. Each of the arms has opposite longitudinal edges which are located on a common edge plane. The common edge planes of the arms are inclined relative to one another to enable engagement of each of the arms in diagonally opposite corners of the rectangular hollow interior of a respective one of the extrusions.

Thus, in use, each arm of the connector extends diagonally across the hollow interior of its respective extrusion, instead of extending along three walls of the interior of the extrusion as in the above-discussed prior art connector. Consequently, the present connector requires substantially less sheet metal than the prior art connectors and can therefore be manufactured more simply and less expensively than the prior art connectors. In addition, the relative inclination of the arms allows respective front and rear faces of the extrusions to be mutually aligned and co-planar when the corner assembly is constructed.

BRIEF DESCRIPTION OF THE DRAWINGS

Further features, objective and advantages of the present invention will be more readily apparent for those skilled in the art from the following description thereof when taken in conjunction with the accompanying drawings, in which;

FIG. 1 shows a broken-away view in front elevation of a corner of a frame formed by two extrusions meeting on another at a right angle;

FIG. 2 and 2a show views taken in cross-section along the lines and 2A—2A, respectively, of FIG. 1;

FIG. 3 shows a side view of a connector and part of the assembly of FIGS. 1 and 2, viewed along one of the two arms of the connector;

FIG. 4 shows a view in perspective of the connector of FIG. 3; and

THE PREFERRED EMBODIMENT

Figure 2A:
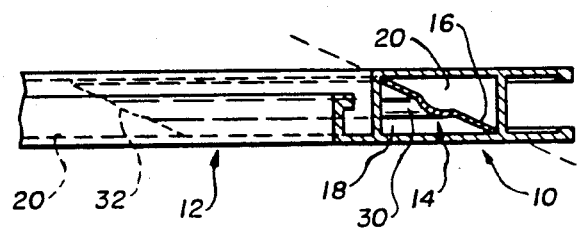

As shown in the accompanying drawing, a pair of metal extrusions indicated generally by reference numerals 10 and 12, respectively, are connected together at a right angle to one another by an L-shaped corner connector indicated generally by reference numeral 14.

As shown in FIG. 1, in which internal edges of the extrusions and the edges of the corner connector 14 are shown in broken lines, the corner connector has a pair of arms indicated generally by reference, numerals 16 and 18 which merge at a right angle, which of course is the angle at which the extrusions 10 and 12 are connected together by the corner connector 14.

As can be seen from FIG. 2, the cross-sectional shape of the extrusion 10, which is identical to that of the extrusion 12, includes a rectangular hollowed interior 20.

As can also be seen from FIG. 2, the arm 16 of the connector 14 extends diagonally across the rectangular hollow interior 20 and engages snugly in diagonally opposite corners of the rectangular hollow interior 20.

Figure 4A:
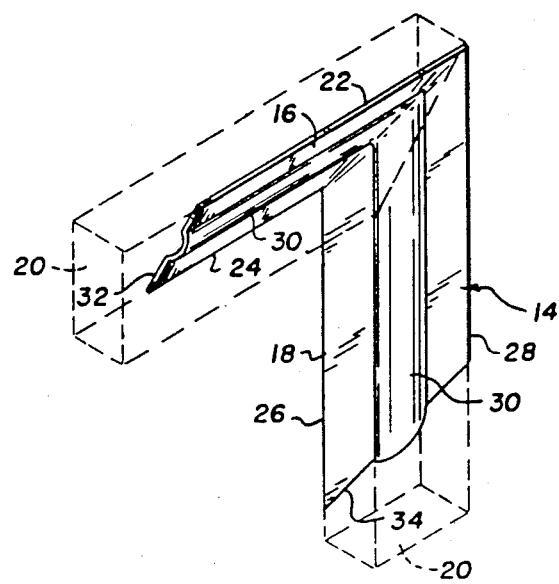
FIG. 4A shows a view corresponding to that of FIG. 4 but with lines representing two planes omitted for clarity.

Referring now to FIG. 4, which shows in broken lines the shapes of the hollow interiors of the two extrusion 10 and 12, with each of these hollow interiors being indicated by reference numeral 20, the arm 16 the corner connector 14 has opposite longitudinal edges 22 and 24, while the arm 18 of the connector 14 has opposite longitudinal edges 26 and 28.

The longitudinal edges 22 and 24 of the arm 16 lie on a common plane P1, and the longitudinal edges 26 and 28 of the arm 18 lie on a different common plane P2.

More particularly the plane P1 that presents the plane of one major surface of the arm 16, while the plane P2 represents the plane of one major surface of the arm 18. The planes P1 and P2 are inclined to one another at an angle a so as to enable the arm 18 to engage at its opposite longitudinal edges 26 and 28 in diagonally opposite corners of the rectangular hollow interior 20 of the extrusion 12.

Each of the arms 16 and 18 of the connector 14 is formed with a longitudinal reinforcement rib 30, to strengthen the arms against bending between a pair of flat, co-planar opposite edge portions 26a and 28a.

Also, as can be seen in FIG. 1, the arms 16 and 18 are formed, at their free ends, with end edges 32 and 34, respectively, which are inclined with respect to the longitudinal directions of the arms 16 and 18, these inclinations facilitating the insertion of the arms 16 and 18 into the hollow interiors 20 at the extrusions 10 and 12.

I claim:
1. A corner assembly, comprising:
    first and second elongate members extending at a predetermined angle to one another, said elongate members each having defined therein a hollow interior of a rectangular cross-sectional shape having diagonally opposite corners and front and rear faces; and
    a corner connector having a pair of arms extending from one another at said predetermined angle,
    wherein each of said arms has a pair of longitudinal edge portions snugly engaged in the diagonally opposite corners of said interior of a respective one of said first and second elongate members, and wherein said arms are inclined relative to one another in respective transverse directions thereof, such that said elongate members have mutually aligned front and rear faces co-planar.

2. A corner assembly as claimed in claim 1, wherein each of said arms of said corner connector extends diagonally across said interior of the respective one of said first and second elongate members.

3. A corner assembly as claimed in claim 1, wherein said corner connector is formed of sheet material, each pair of said longitudinal edge portions being formed by a pair of parallel longitudinal edges and said edges being engaged in said diagonally opposite corners.

4. A corner assembly as claimed in claim 1, wherein said corner connector is formed of sheet metal and each of said arms is formed with a longitudinal reinforcement rib, each pair of said edge portions comprising a pair of flat, co-planar portions disposed at opposite sides of said reinforcement rib and said co-planar portions having longitudinal edges engaged in said diagonally opposite corners.

5. A corner assembly as claimed in claim 4, wherein each of said arms has a free end having an end edge extending across the respective arm at an inclination to the length of the arm.

6. A corner assembly as claimed in claim 1, wherein each of said arms of said corner connector extends diagonally across said interior of the respective one of said first and second elongate members.

7. A corner assembly as claimed in claim 1, wherein said corner connector is formed of sheet material, each pair of said longitudinal edge portions being formed by a pair of parallel longitudinal edges and said edges being engaged in said diagonally opposite corners.

8. A corner assembly as claimed in claim 1, wherein said corner connector is formed of sheet metal and each of said arms is formed with a longitudinal reinforcement rib, each pair of said edge portions comprising a pair of flat, co-planar portions disposed at opposite sides of said reinforcement rib and said co-planar portions having longitudinal edges engaged in said diagonally opposite corners.

9. A corner assembly as claimed in claim 8, wherein each of said arms has a free end having an end edge extending across the respective arm at an inclination to the length of the arm.

* * * * *

UNITED STATES PATENT AND TRADEMARK OFFICE
CERTIFICATE OF CORRECTION

PATENT NO. : 4,982,547

DATED : January 8, 1991

INVENTOR(S) : K. Stolle; G. Schoeffel

It is certified that error appears in the above-identified patent and that said Letters Patent is hereby corrected as shown below:

ON TITLE PAGE:

Abstract, line 2, change "cross-section" to -- cross section --.

Column 1, line 8, change "cross-section" to -- cross section --.
Column 1, line 16, change "cross-sections" to -- cross section --.
Column 1, line 17, change "coupling" to -- coupled --.
Column 1, line 62, change "FIG." to -- FIGS. --.
Column 1, line 62, change "cross-section" to -- cross section --.
Column 1, line 63, change "lines and 2A-2A" to -- lines 2-2 and 2A-2A --.

Column 2, lines 27,28, change "extrustion" to -- extrusions --.
Column 2, line 29, insert "of" after "16".
Column 2, line 36, change "presents" to -- represents --.
Column 2, line 40, after "angle" delete "a".

UNITED STATES PATENT AND TRADEMARK OFFICE
CERTIFICATE OF CORRECTION

PATENT NO. : 4,982,547

DATED : January 8, 1991

INVENTOR(S) : K. Stolle; G. Schoeffel

It is certified that error appears in the above-identified patent and that said Letters Patent is hereby corrected as shown below:

In the Claims

Column 3, line 4, move "co-planar" to come before "front".

Signed and Sealed this

Fourth Day of August, 1992

*Attest:*

DOUGLAS B. COMER

*Attesting Officer*      Acting Commissioner of Patents and Trademarks